United States Patent
Malinin

(10) Patent No.: US 9,337,714 B2
(45) Date of Patent: May 10, 2016

(54) POWER CONVERTER WITH FAST DISCHARGE CIRCUIT

(71) Applicant: Dialog Semiconductor Inc., Campbell, CA (US)

(72) Inventor: Andrey Malinin, Fort Collins, CO (US)

(73) Assignee: Dialog Semiconductor Inc., Campbell, CA (US)

( * ) Notice: Subject to any disclaimer, the term of this patent is extended or adjusted under 35 U.S.C. 154(b) by 5 days.

(21) Appl. No.: 14/174,417

(22) Filed: Feb. 6, 2014

(65) Prior Publication Data

US 2015/0222173 A1    Aug. 6, 2015

(51) Int. Cl.
*H02M 3/335* (2006.01)
*H02M 1/08* (2006.01)
*H02M 1/00* (2006.01)

(52) U.S. Cl.
CPC ............ *H02M 1/08* (2013.01); *H02M 3/33507* (2013.01); *H02M 2001/0032* (2013.01); *Y02B 70/16* (2013.01)

(58) Field of Classification Search
CPC . H02M 3/156; H02M 3/335; H02M 3/33592; H02M 3/3376; Y02B 70/126
USPC ............ 363/16–20, 21.02, 21.12, 44, 74, 79, 363/89, 97, 98, 127; 323/207, 222, 323/282–288
See application file for complete search history.

(56) References Cited

U.S. PATENT DOCUMENTS

| | | | | | |
|---|---|---|---|---|---|
| 4,315,304 | A | * | 2/1982 | Marez | H01F 17/06 340/662 |
| 4,468,722 | A | * | 8/1984 | Kammiller | H02M 3/33515 307/44 |
| 4,661,882 | A | * | 4/1987 | Presley | H01F 7/1877 318/685 |
| 5,173,847 | A | * | 12/1992 | Suzuki | 363/21.14 |
| 5,495,149 | A | * | 2/1996 | Hiramatsu et al. | 315/209 R |
| 5,532,913 | A | * | 7/1996 | Suzuki et al. | 363/25 |
| 5,621,625 | A | * | 4/1997 | Bang | 363/21.1 |
| 6,944,034 | B1 | * | 9/2005 | Shteynberg | H02M 1/4258 323/282 |
| 8,587,280 | B2 | * | 11/2013 | Colbeck et al. | 323/282 |
| 8,982,584 | B2 | * | 3/2015 | Shi | H02M 3/33507 363/21.12 |
| 2002/0163371 | A1 | * | 11/2002 | Hall | H02M 3/33523 327/175 |
| 2009/0016086 | A1 | * | 1/2009 | Huynh | H02M 3/33523 363/80 |
| 2010/0164458 | A1 | * | 7/2010 | Pollard | F42C 11/04 323/284 |
| 2010/0327835 | A1 | * | 12/2010 | Archibald | H05B 33/0818 323/282 |
| 2012/0139477 | A1 | * | 6/2012 | Oglesbee | H02J 7/00 320/107 |
| 2013/0294118 | A1 | * | 11/2013 | So | H02M 3/33507 363/21.16 |

OTHER PUBLICATIONS

PCT International Search Report and Written Opinion, PCT Application No. PCT/US15/10661, Apr. 10, 2015, 13 pages.

* cited by examiner

*Primary Examiner* — Rajnikant Patel
(74) *Attorney, Agent, or Firm* — Fenwick & West LLP

(57) ABSTRACT

A power converter with fast discharging to adapt to a load disconnect. The power converter comprises a magnetic component coupled between an input of the power converter and an output of the power converter. The magnetic component includes a primary winding and a secondary winding. A switch controls transfer of energy from the primary winding to the secondary winding according to on and off times of the switch. A discharge circuit is coupled to the output of the power converter. The discharge circuit is adapted to receive a signal indicative of whether the load is disconnected and to decrease an output voltage at the output of the power converter based on the signal indicative of whether the load is disconnected.

18 Claims, 4 Drawing Sheets

POWER CONVERTER WITH FAST DISCHARGE CIRCUIT

BACKGROUND

1. Field of the Disclosure

The present disclosure relates to a power converter and, more specifically, to a power converter delivering different fixed voltage levels.

2. Description of the Related Art

With the recent explosive growth in electronic devices, demand for a power converter used as an adapter or a charger for these electronic devices has also grown at a rapid rate. The power converter is typically controlled by a power converter controller. In particular, a switched mode power converter is typically controlled by the power converter controller that controls on-times ($T_{ON}$) or off-times ($T_{OFF}$) of a switch in the power converter to regulate an output voltage and output power of the power converter.

Conventional power converters deliver a constant output voltage at a fixed voltage level (e.g. 5 V). Newer power converters are beginning to introduce the ability to deliver the constant output voltage at different fixed voltage levels (e.g. 5V, 9V and 12V) for faster charging of the electronic devices. However, using a single power converter with different electronic devices having differing voltage requirements creates a risk that an electronic device may be provided with a voltage that is higher than can be supported by the device, thereby irreparably damaging the device.

SUMMARY

Embodiments of the present disclosure include a power converter with fast discharging to efficiently adapt to a load disconnect from use, or a change in a condition (requirement) of the load. In one embodiment, a power converter provides power to a load. The power converter comprises a magnetic component coupled between an input of the power converter and an output of the power converter. The magnetic component includes a primary winding and a secondary winding. A switch controls transfer of energy from the primary winding to the secondary winding according to on and off times of the switch. A discharge circuit is coupled to the output of the power converter. The discharge circuit is adapted to receive a signal indicative of whether the load is disconnected and to decrease an output voltage at the output of the power converter based on the signal indicative of whether the load is disconnected. The discharge circuit can thus quickly reduce the output voltage to a lower voltage level that is safe for different types of loads having different voltage requirements.

In one embodiment, a method of operation in a power converter providing power to a load is disclosed. The method comprises transferring energy from a primary winding of a magnetic component to a secondary winding of the magnetic component according to on and off times of a switch. The method also comprises decreasing, by a discharge circuit coupled to an output of the power converter, an output voltage at the output of the power converter based on a signal indicative of whether the load is disconnected.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

The teachings of the embodiments of the present disclosure can be readily understood by considering the following detailed description in conjunction with the accompanying drawings.

DETAILED DESCRIPTION OF EMBODIMENTS

The Figures (FIG.) and the following description relate to preferred embodiments of the present disclosure by way of illustration only. Reference will now be made in detail to several embodiments of the present disclosure, examples of which are illustrated in the accompanying figures. It is noted that wherever practicable similar or like reference numbers may be used in the figures and may indicate similar or like functionality. One skilled in the art will readily recognize from the following description that alternative embodiments of the structures and methods illustrated herein may be employed without departing from the principles of the disclosure described herein.

Embodiments of the present disclosure relate to a power converter with fast discharging to efficiently adapt to a change in a condition (e.g. due to load disconnect) of the load. The power converter converts an input power to an output power, and delivers the output power to the load. The discharge circuit can draw a discharge current from the output of the power converter based on a sensing signal indicative of the change in the condition of the load. The discharge circuit can draw the discharge current until the output voltage decreases below an output threshold voltage level.

Figure 1:
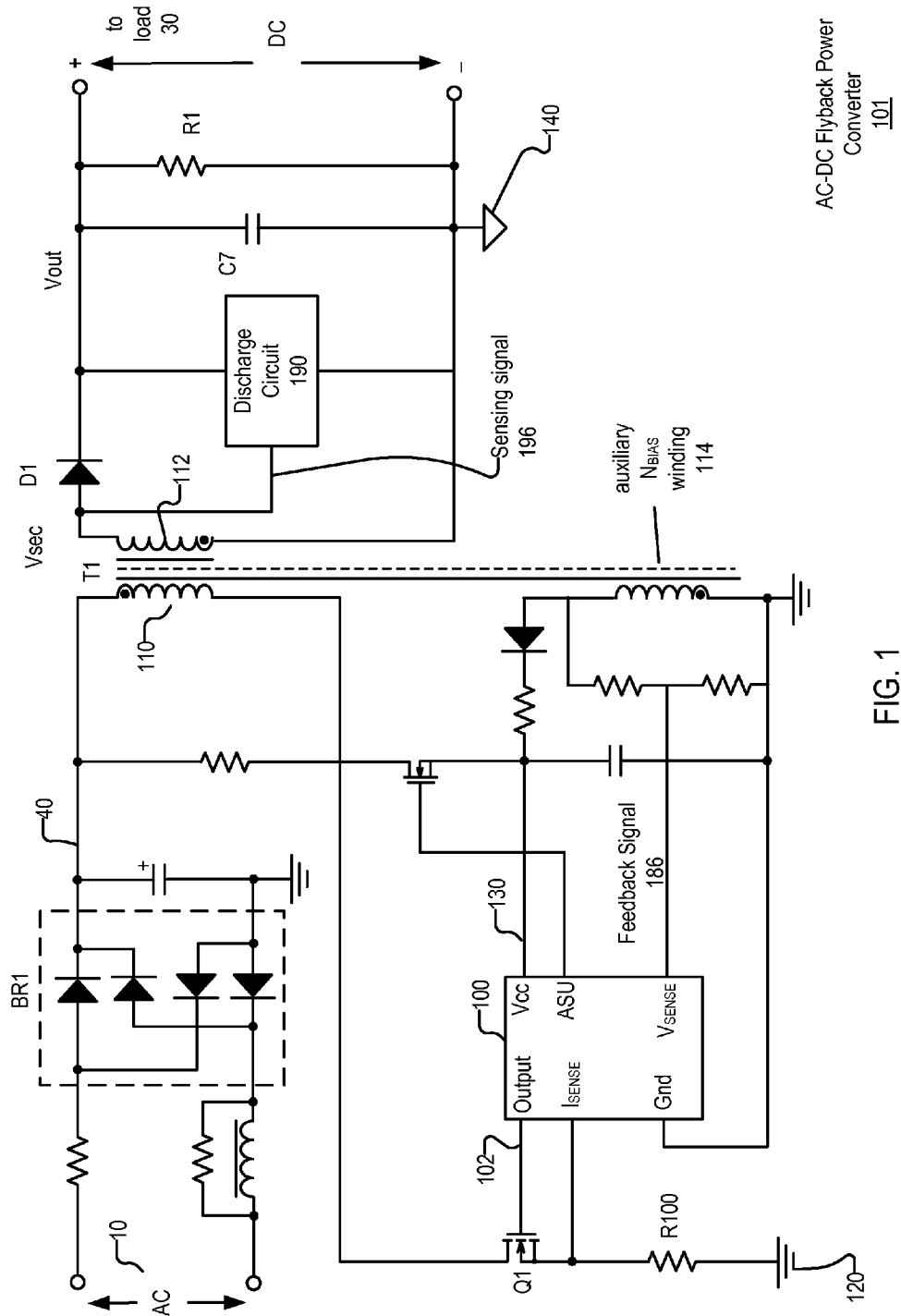
FIG. 1 is an AC-DC flyback power converter with fast discharging, according to one embodiment of the present disclosure.

FIG. 1 illustrates an AC-DC flyback power converter 101 with fast discharging, according to an exemplary embodiment. The power converter 101 includes, among other components, a bridge rectifier BR1, a transformer T1, a transistor switch Q1, an output rectifier diode D1, an output filter capacitor C7, a preload resistor R1, a power converter controller 100, and a discharge circuit 190.

The power converter 101 receives an AC input voltage 10, converts it into a DC output voltage Vout at one of several possible fixed voltage levels, and provides the DC output voltage Vout to the load 30. The load 30 can be, for example, an electronic device that is powered by the DC output voltage Vout through an output cable (e.g. Universal Serial Bus (USB) cable) between a power adapter and the electronic device. Different types of loads having voltage requirements can be connected to the power converter 101, and the power converter 101 regulates the DC output voltage Vout to a level that is appropriate for a given load. Although the power converter 101 of FIG. 1 is an AC-DC flyback power converter with primary side sensing of the feedback signals, it should be noted that the present disclosure is not limited to a flyback converter and that it can be applied to any type of switching power converter of any topology (e.g. forward converter, etc).

The bridge rectifier BR1 receives the AC input voltage 10 and converts it into a full-wave rectified input voltage 40 for use in generating the DC output voltage Vout. The full-wave rectified input voltage 40 is provided to the primary winding 110 of the transformer T1. A secondary winding 112 of the transformer T1 is connected to the output of the power converter 101 through the output rectifier diode D1. The transformer T1 also includes an auxiliary $N_{BIAS}$ winding 114 having a reflected secondary voltage that is proportional to a voltage Vsec on the secondary winding 112 of the transformer T1. The transformer T1 is an example of a magnetic component. It is to be noted that, the bridge rectifier BR1 can be replaced with any type of rectifier.

The power converter controller 100 receives a power supply voltage 130 via a Vcc pin, and is connected to a primary ground 120 via the Gnd pin. For an active start up (ASU) feature, an ASU pin provides an ASU control signal 132 to actively start the power converter controller 100. In one embodiment, the power converter controller 100 is an integrated circuit (IC).

The power converter controller 100 controls an opening and closing (i.e. turning on and turning off) of the transistor switch Q1 using an output control signal 102 in a form of pulses with on-times ($T_{ON}$) and off-times ($T_{OFF}$). The pulses may be generated with pulse width modulation (PWM), pulse frequency modulation (PFM) or a combination of PWM and PFM. When the transistor switch Q1 is turned on, current flows through the transformer T1 and causes energy to be stored in the primary winding 110 of the transformer T1. The voltage Vsec on the secondary winding 112 of the transformer T1 is negative and causes the output rectifier diode D1 to be reverse biased. When the transistor switch Q1 is turned off, the energy stored in the primary winding 110 of the transformer T1 is released to the secondary winding 112 of the transformer T1. The voltage Vsec on the secondary winding 112 of the transformer T1 becomes positive and causes the output rectifier diode D1 to become forward biased. The output rectifier diode D1 rectifies the voltage Vsec on the secondary winding 112 of the transformer T1, and the output filter capacitor C7 filters the voltage Vsec on the secondary winding 112 of the transformer T1 for generating the DC output voltage Vout. By controlling a frequency and/or pulse duration of time during which the transistor switch Q1 is on or off (i.e. the $T_{ON}$ and $T_{OFF}$), the power converter controller 100 can control the amount of energy delivered to the output of the power converter 101.

An $I_{SENSE}$ pin in the power converter controller 100 senses the current flowing through the transistor switch Q1 based on the voltage drop across resistor R100. A $V_{SENSE}$ pin receives a feedback signal 186 which is a divided-down version of the reflected secondary voltage on the auxiliary $N_{BIAS}$ winding 114 of the transformer T1. The current sensed on the $I_{SENSE}$ pin and/or the feedback signal 186 received on the $V_{SENSE}$ pin are then used to regulate the on and off times of the transistor switch Q1, thereby regulating the DC output voltage Vout to a constant voltage level.

In one embodiment, the power converter controller 100 monitors current through the transistor switch Q1, which is proportional to the output current assuming the output voltage Vout is constant, to determine what voltage level to regulate the output voltage Vout to. Different loads may request different output voltage levels (e.g. 5V, 9V, 12 V), depending on the design of the electronic device serving as the load 30. The load 30 requests a specific output voltage level by drawing pulses of current from the output of the power converter 101. The $I_{SENSE}$ pin of the power converter controller 100 detects a specific current profile generated from the load 30. The specific current profile acts as a command string to indicate to the power converter controller 100 whether to increase or decrease the DC output voltage Vout accordingly. For example, the command is repeated to increase or decrease the DC output voltage Vout until reaching a desired voltage level. In other embodiments, other communication techniques may be used for the load 30 to request a particular output voltage level from the power converter controller 100.

Additionally, the power converter controller 100 detects a load disconnect by monitoring the current through the transistor Q1, which corresponds to the output current. For example, if the average current through the transistor Q1 falls below a certain current level for a predetermined time period, the power converter controller 100 determines the load 30 is disconnected.

As the power converter 101 of FIG. 1 is a primary side sensing type, it periodically checks the level of the DC output voltage Vout by sensing the feedback signal 186. The feedback signal 186 only includes valid voltage information when the input power is transferred from the primary winding 110 of the transformer T1 to the secondary winding 112 of the transformer T1. When the load 30 is consuming the output power from the output of the power converter 101, the transistor switch Q1 is constantly being switched using the PWM and/or the PFM to transfer the energy from the primary winding 110 of the transformer T1 to the secondary winding 112 of the transformer T1 to deliver the output power to the load 30. On the other hand, when the load 30 is not consuming the output power or is disconnected from the power converter 101, the transistor switch Q1 is only switched at infrequent intervals using short pulses (i.e. standby sense pulses). These standby sense pulses transfer the energy from the primary winding 110 of the transformer T1 to the secondary winding 112 of the transformer T1 primarily for sensing the DC output voltage Vout.

The preload resistor R1 is coupled between the output of the power converter 101 and the secondary ground 140. In one embodiment according to the present disclosure, the preload resistor R1 may be replaced with an adjustable preload. The preload resistor R1 is also coupled in parallel to the output filter capacitor C7 and dissipates the energy that is transferred to the secondary winding 112 of the transformer T1 by the standby sense pulses, during no load or standby light load conditions.

The discharge circuit 190 is coupled between the output of the power converter 101 and the secondary ground 140. In addition, the discharge circuit 190 is coupled to the secondary winding 112 of the transformer T1 to receive the sensing signal 196. The sensing signal 196 tracks the voltage at the secondary winding 112 and includes voltage pulses that represent the energy transferred from the primary winding 110 of the transformer T1 to the secondary winding 112 of the transformer T1. When the sensing signal 196 includes only narrow or infrequency pulses, this indicates that the standby sense pulses are being used and that a loading condition has changed, for example, because the load 30 has been disconnected.

Discharge circuit 190 selectively discharges the output filter capacitor C7 depending on a state of the sensing signal 196. When the sensing signal 196 indicates that the load 30 is connected (e.g. due to high frequency and/or wide pulses), the discharge circuit 190 is disabled and does not attempt to discharge the output filter capacitor C7. However, when the sensing signal 196 indicates that the load 30 is disconnected, the discharge circuit 190 decreases the DC output voltage Vout, if necessary, to a lower voltage level that is safe for different types of loads having different voltage requirements.

A problem with supporting multiple voltage levels is that when the load 30 being powered from a high voltage (e.g. 12 V) is disconnected, charge stored in the output filter capacitor C7 causes the DC output voltage Vout to remain at 12 V for some period of time after the load 30 is disconnected. If a new load that requires a lower voltage (e.g. 5 V) is then connected to the power converter, the 12 V DC output voltage Vout will damage the new load. To prevent damage to the new load, the discharge circuit 190 senses the amount of energy transferred to the secondary winding 112 via the sensing signal 196. If little energy is being transferred, it indicates that the load 30 has been disconnected. The discharge circuit 190 then discharges the charge to decrease the DC output voltage Vout to the lower voltage level that is appropriate for powering the new load that requires the lower voltage.

Figure 2:
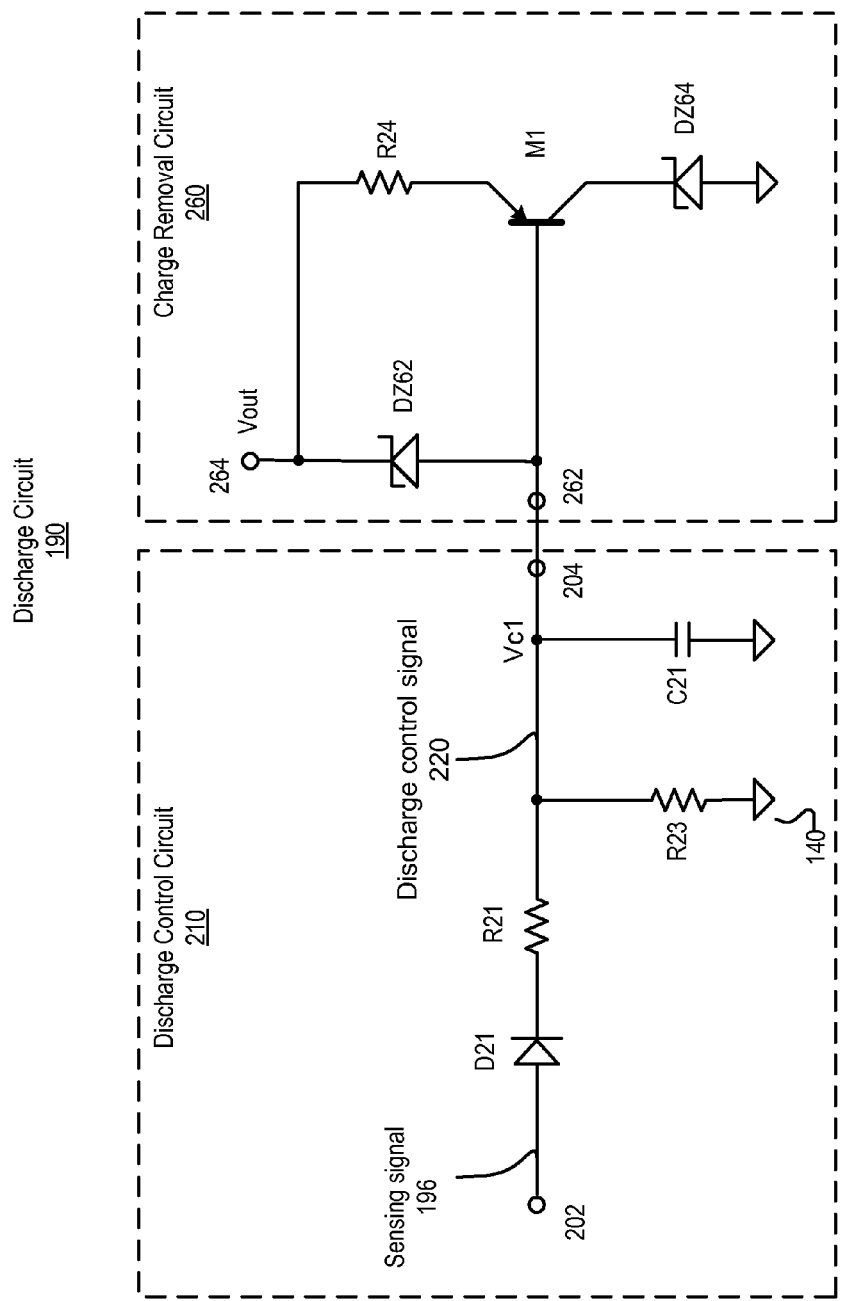
FIG. 2 is a detailed view of a discharge circuit of the AC-DC flyback power converter from FIG. 1, according to one embodiment of the present disclosure.

Referring to FIG. 2, illustrated is a detailed view of the discharge circuit 190 from FIG. 1, according to one embodiment of the present disclosure. The discharge circuit 190 includes a discharge control circuit 210 and a charge removal circuit 260. The discharge control circuit 210 receives the sensing signal 196 indicative of whether the load 30 is disconnected, and generates a discharge control signal 220 based on the sensing signal 196. Furthermore, based on the discharge control signal 220, the charge removal circuit 260 decreases the DC output voltage Vout of the output of the power converter 101 from a higher level to a lower non-zero level by discharging the output filter capacitor C7.

As illustrated in FIG. 2, one embodiment of the discharge control circuit 210 according to the present disclosure, includes a discharge control diode D21, a first discharge control resistor R21, a second discharge control resistor R23, and a discharge control capacitor C21. The discharge control diode D21 is coupled between an input 202 and an output 204 of the discharge control circuit 210. The anode of the discharge control diode D21 receives the sensing signal 196 from the input 202 of the discharge control circuit 210. The cathode of the discharge control diode D21 is coupled to the output 204 of the discharge control circuit 210 through the first discharge control resistor R21.

The second discharge control resistor R23 and the discharge control capacitor C21 are coupled between the output 204 of the discharge control circuit 210 and the secondary ground 140 in parallel. This configuration is similar to the output rectifier diode D1, the output filter capacitor C7 and the preload resistor R1 in FIG. 1. However, values of these components are chosen such that, the discharge control capacitor C21 discharges faster than the output filter capacitor C7. For example, C21 can be much smaller than C7, thereby storing less charge than C7. Assuming that R1 and R23 are the same value, the RC time constant of C21 and R23 is also much smaller than the RC time constant of C7 and R1. In one embodiment C7 is 680 uF, R1 is 10 kOhms, C21 is 1 uF and R23 is 10 kOhms.

In an alternative embodiment, the cathode of the discharge control diode D21 may be directly coupled to the output of the discharge control circuit 210 without the first discharge control resistor R21. In another alternative embodiment, the placement of the first discharge control resistor R21 and the discharge control diode D21 may be swapped, such that the cathode of the discharge control diode D21 is coupled to the output 204 of the discharge control circuit 210 and the anode of the discharge control diode D21 is coupled to the input 202 of the discharge control circuit 210 through the first discharge control resistor R21.

The charge removal circuit 260 according to the present disclosure includes a first zener diode DZ62, a second zener diode DZ64, a charge removal resistor R24, and a PNP transistor M1. An anode of the first zener diode DZ62 is coupled to an input 262 of the charge removal circuit 260, and the cathode of the first zener diode DZ62 is coupled to an output 264 of the charge removal circuit 260. The first zener diode DZ62 ensures a voltage difference between the input 262 and the output 264 of the charge removal circuit 260 does not exceed a predefined voltage difference limit. For example, the predefined voltage difference limit may be in a range of 1.4 V-1.5V. A base terminal (i.e. control terminal) of the PNP transistor M1 is coupled to the input 262 of the charge removal circuit 260, and an emitter terminal of the PNP transistor M1 is coupled to the output 264 of the charge removal circuit 260 through the charge removal resistor R24. In addition, the cathode of the second zener diode DZ64 is coupled to a collector terminal of the PNP transistor M1, and the anode of the second zener diode DZ64 is coupled to the secondary ground 140.

The PNP transistor M1 operates as a current source, and the charge removal resistor R24 with the first zener diode DZ62 provides an appropriate bias to the PNP transistor M1. That is, depending on a voltage difference between a voltage Vc1 of the discharge control signal 220 and the DC output voltage Vout, the PNP transistor M1 conducts and decreases the DC output voltage Vout of the output of the power converter 101 by discharging the output filter capacitor C7. The second zener diode DZ64 ensures that the DC output voltage Vout does not fall below an output threshold voltage level (i.e. the desired voltage level for the DC output voltage Vout) by preventing the PNP transistor M1 from conducting once the voltage across the second zener diode DZ64 falls below its breakdown voltage. The breakdown voltage for the second zener diode DZ64 should be low enough to let the discharge circuit 190 reduce the DC output voltage Vout to the desired voltage level. Additionally, the breakdown voltage for the second zener diode DZ64 should be high enough to prevent the discharge circuit 190 from consuming current at the desired voltage level for the DC output voltage Vout. For example, if the desired voltage level for the DC output voltage Vout is 5V, the breakdown voltage may be in a range of 5~5.5 V.

In an alternative embodiment, the first zener diode DZ62, the charge removal resistor R24 and the PNP transistor M1 can be replaced with any type of current source circuitries. Additionally and alternatively, the second zener diode DZ64 can be replaced with any type of voltage regulating circuitries or devices. In another alternative embodiment, any type of transistors including an NPN of a BJT, MOSFET and other devices with similar or varying configurations can be used to replace the PNP transistor M1.

Figure 3:
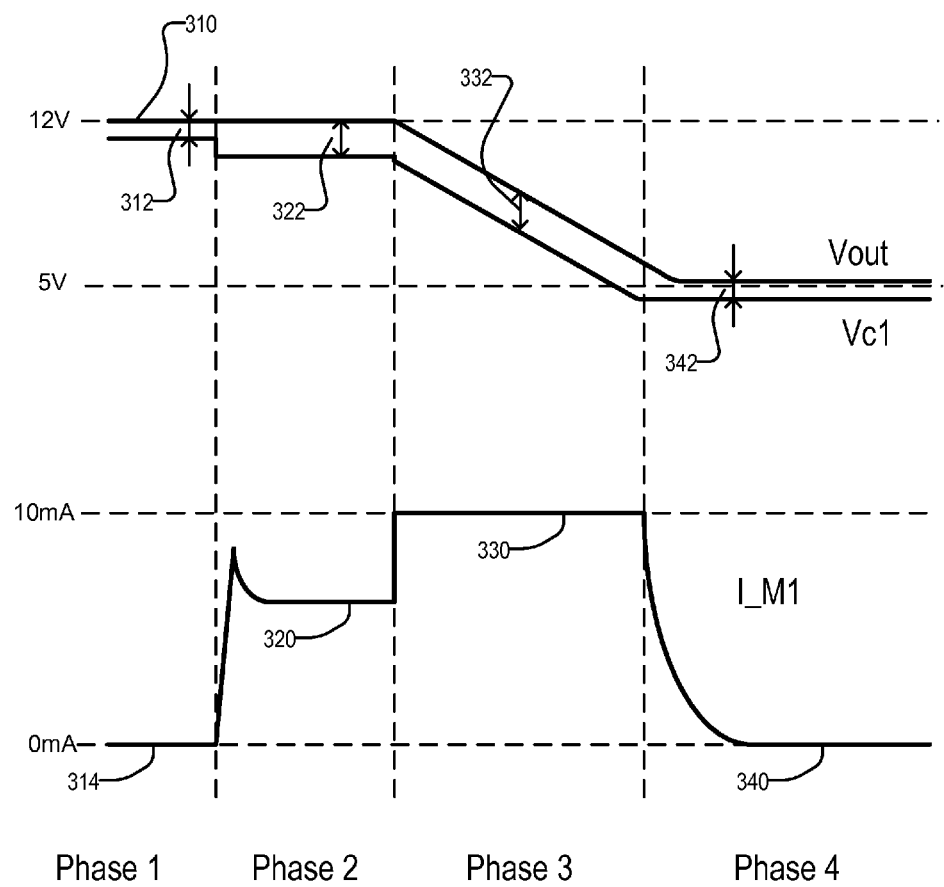
FIG. 3 is a timing diagram illustrating an operation of the discharge circuit of the AC-DC flyback power converter from FIG. 1 to lower an output voltage of the AC-DC flyback power converter in response to a load disconnect, according to one embodiment of the present disclosure.
Figure 4:
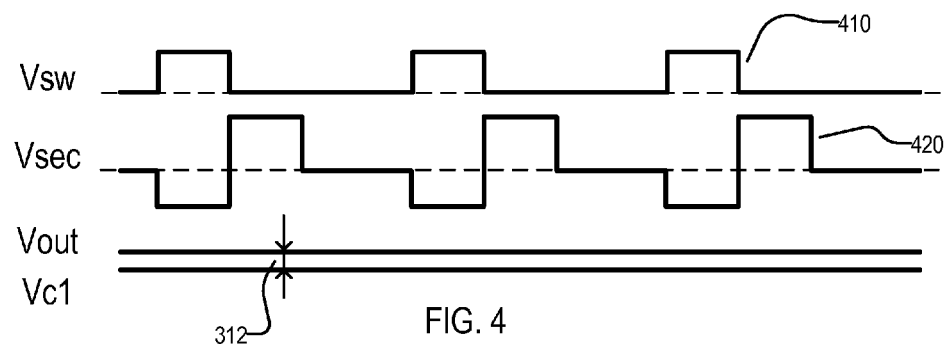
FIG. 4 is a timing diagram illustrating the operation of the AC-DC flyback power converter from FIG. 1 in phase 1, delivering a high output voltage to the load, according to one embodiment of the present disclosure.

Referring to FIG. 3, illustrated is a timing diagram of the operation of the power converter 101 with the fast discharging according to an embodiment. The timing diagram includes waveforms for the DC output voltage Vout, the discharge control signal Vc1, and discharge current I_M1 of transistor M1. In phase 1, the load 30 is still connected to the power converter 101, and the power converter 101 supplies a high voltage value (e.g. 12 V) of the DC output voltage Vout to the load 30. As illustrated in FIG. 4, during phase 1, the transistor switch Q1 is switched at a high frequency and/or with a wide pulse width 410 as indicated by a voltage Vsw of the output control signal 102 to transfer a high amount of energy to the secondary winding 112. Accordingly, the sensing signal 196 includes frequent and/or wide pulses 420 as indicated by the voltage Vsec on the secondary winding 112 of the transformer T1. The voltage Vc1 of the discharge control signal 220 is slightly less than the DC output voltage Vout, such that the voltage difference 312 in phase 1 between the DC output voltage Vout and the voltage Vc1 of the discharge control signal 220 is not large enough for the PNP transistor M1 to conduct. Hence, the discharge current I_M1 flowing through the PNP transistor M1 in phase 1 becomes zero or insignificant at level 314.

Referring back to FIG. 3, in phase 2, the load 30 is disconnected from the power converter 101, therefore changing a loading condition of the power converter 101. The load disconnect results in brief increase in the DC output voltage Vout (not shown), because the load 30 no longer draws the output power from the DC output voltage Vout. The power converter controller 100 monitors the output current of the power converter 101 through the feedback signal 186 and detects the increase in the DC output voltage Vout. In response, the power converter controller 100 switches the transistor Q1 at a lower frequency and/or with a narrower pulse width 510, as illustrated in FIG. 5, to reduce the amount of energy transferred to the secondary winding 112.

Figure 5:
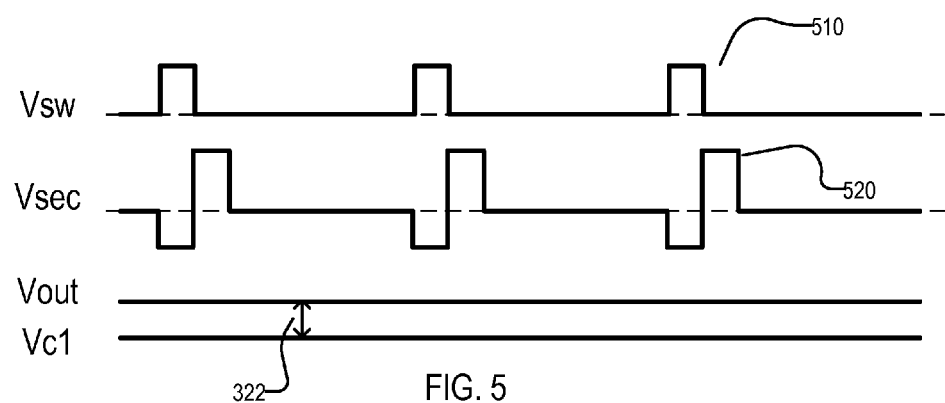
FIG. 5 is a timing diagram illustrating the operation of the AC-DC flyback power converter from FIG. 1 in phase 2, after the load disconnect and before a power converter controller determines the load disconnect according to one embodiment of the present disclosure.

As illustrated in FIG. 5, the sensing signal 196 includes less frequent and/or narrower pulses 520 as indicated by the voltage Vsec on the secondary winding 112 of the transformer T1. Due to the less frequent and/or narrower pulses 520 of the sensing signal 196, the discharge control resistor R23 discharges the discharge control capacitor C21. It is to be noted that, the preload resistor R1 discharges the output filter capacitor C7 as well, but the discharge control capacitor C21 is discharged at a faster rate than the output filter capacitor C7, thus the voltage difference 322 between the DC output voltage Vout and the voltage Vc1 of the discharge control signal 220 becomes large enough for the PNP transistor M1 to conduct. Hence, the discharge current I_M1 flows through the PNP transistor M1 in phase 2 at a first current level 320, and discharges the output filter capacitor C7. However, the energy transferred to the load 30 according to the output control signal 102 prevents the DC output voltage Vout from decreasing.

Figure 6:
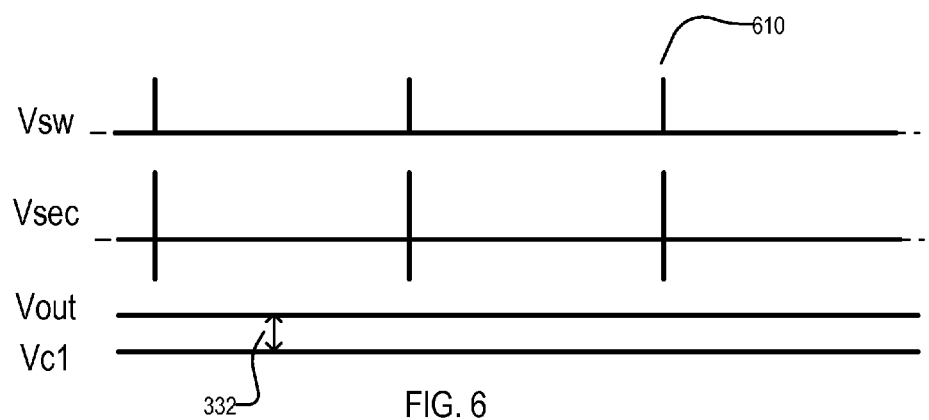
FIG. 6 is a timing diagram illustrating the operation of the AC-DC flyback power converter from FIG. 1 in phase 3, after the power converter controller determines the load disconnect according to one embodiment of the present disclosure.

Referring back to FIG. 3, in phase 3, after the power converter controller 100 monitors for a decrease in the output current of the power converter 101 (e.g. indirectly via the Isense pin) for a certain time limit (e.g. 200 ms), the power converter controller 100 determines the load 30 is disconnected, and lowers the DC output voltage Vout by switching the transistor switch Q1 with the standby sense pulses. As illustrated in FIG. 6, the standby sense pulses switch the transistor switch Q1 infrequently and/or with small pulses as indicated by the voltage Vsw of the output control signal 102, to transfer almost no energy to the secondary winding 112. Also, the voltage difference 332 in phase 3 between the DC output voltage Vout and the voltage Vc1 of the discharge control signal 220 is maintained large enough for the PNP transistor M1 to conduct and discharge the output filter capacitor C7. Thus, the discharge current I_M1 flows through the PNP transistor M1 in phase 3 at a second current level 330 (e.g. 10 mA), and discharges the output filter capacitor C7 at a rapid rate. Therefore, the discharge circuit 190 rapidly decreases the DC output voltage Vout, along with the voltage Vc1 of the discharge control signal 220 as illustrated in FIG. 3.

Once the DC output voltage Vout reaches the output threshold voltage level, the PNP transistor M1 stops conducting in phase 4, because the PNP transistor M1 no longer operates in a linear amplification region. Thus, the voltage difference 342 in phase 4 between the DC output voltage Vout and the voltage Vc1 of the discharge control signal 220 is reduced. Therefore, the discharge current I_M1 flowing through the PNP transistor M1 in phase 4 becomes zero or insignificant at level 340 as in phase 1. In addition, the power converter controller 100 switches the transistor switch Q1 with the standby sense pulses that maintain the DC output voltage Vout at a relatively constant low voltage level (e.g. 5 V).

By utilizing the discharge circuit 190 to decrease the DC output voltage Vout as the output loading condition changes (e.g. due to a load disconnect), the power converter 101 can be safely used to provide power to different types of loads having different voltage requirements.

Upon reading this disclosure, those of ordinary skill in the art will appreciate still additional alternative structural and functional designs for a power converter with fast discharging through the disclosed principles of the present disclosure. Thus, while particular embodiments and applications of the present disclosure have been illustrated and described, it is to be understood that the disclosure is not limited to the precise construction and components disclosed herein. Various modifications, changes and variations which will be apparent to those skilled in the art may be made in the arrangement, operation and details of the method and apparatus of the present disclosure disclosed herein without departing from the spirit and scope of the disclosure as defined in the appended claims.

What is claimed is:

1. A power converter for providing power to a load, the power converter comprising:
   a magnetic component coupled between an input of the power converter and an output of the power converter, the magnetic component comprising a primary winding and a secondary winding;
   a switch to control transfer of energy from the primary winding to the secondary winding according to on and off times of the switch; and
   a discharge circuit coupled to the output of the power converter, the discharge circuit adapted to receive a signal indicative of whether the load is disconnected and to enable a discharge path coupled to the output to decrease an output voltage at the output of the power converter in response to the signal indicative of whether the load is disconnected.

2. The power converter of claim 1, wherein the discharge circuit comprises:
   a discharge control circuit to receive the signal indicative of whether the load is disconnected and to generate a discharge control signal based on the signal indicative of whether the load is disconnected; and
   a charge removal circuit to enable the discharge path decrease the output voltage at the output of the power converter based on the discharge control signal.

3. The power converter of claim 2, wherein the discharge control circuit comprises:
a diode receiving the signal indicative of whether the load is disconnected at an anode of the diode;
a resistor coupled to a cathode of the diode; and
a discharge control capacitor coupled in parallel to the resistor,
wherein the discharge control signal corresponds to a voltage across the discharge control capacitor.

4. The power converter of claim 3, wherein the discharge control capacitor is smaller than an output capacitor at the output of the power converter.

5. The power converter of claim 2, wherein the charge removal circuit comprises:
a current source adapted to sink current from the output of the power converter based on the discharge control signal.

6. The power converter of claim 5, wherein the current source sinks the current until the output voltage at the output of the power converter decreases below a threshold voltage level.

7. The power converter of claim 1, further comprising:
an output capacitor at the output of the power converter,
wherein the discharge circuit decreases the output voltage at the output of the power converter by discharging the output capacitor through the discharge circuit.

8. The power converter of claim 1, wherein the discharge circuit decreases the output voltage at the output of the power converter from a first voltage level to a second voltage level, the first voltage level corresponding to voltage requirements of a first type of the load and the second voltage level corresponding to voltage requirements of a second type of the load.

9. The power converter of claim 1, wherein the discharge circuit decreases the output voltage at the output of the power converter responsive to the signal indicating that the load is disconnected.

10. The power converter of claim 1, wherein the signal indicative of whether the load is disconnected includes pulses corresponding to the energy transferred from the primary winding to the secondary winding that indicate whether the load is disconnected.

11. A method of operation in a power converter configured to provide power to a load, the method comprising:
transferring energy from a primary winding of a magnetic component to a secondary winding of the magnetic component according to on and off times of a switch; and
enabling a discharge path of a discharge circuit coupled to an output of the power converter to decrease an output voltage at the output of the power converter in response to a signal indicative of whether the load is disconnected.

12. The method of claim 11, wherein enabling the discharge path to decrease the output voltage at the output of the power converter comprises:
generating, by the discharge circuit, a discharge control signal based on the signal indicative of whether the load is disconnected; and
decreasing, by the discharge circuit, the output voltage at the output of the power converter based on the discharge control signal.

13. The method of claim 12, wherein enabling the discharge path to decrease the output voltage at the output of the power converter comprises sinking current with a current source from the output of the power converter based on the discharge control signal.

14. The method of claim 13, wherein the current source sinks the current until the output voltage at the output of the power converter decreases below a threshold voltage level.

15. The method of claim 11, wherein enabling the discharge path to decrease the output voltage at the output of the power converter comprises decreasing the output voltage by discharging, through the discharge circuit, an output capacitor coupled to the output of the power converter.

16. The method of claim 11, wherein enabling the discharge path to decrease the output voltage at the output of the power converter comprises:
decreasing the output voltage at the output of the power converter from a first voltage level to a second voltage level, the first voltage level corresponding to voltage requirements of a first type of the load and the second voltage level corresponding to voltage requirements of a second type of the load.

17. The method of claim 11, wherein enabling the discharge path to decrease the output voltage at the output of the power converter comprises:
decreasing the output voltage at the output of the power converter responsive to the signal indicating that the load is disconnected.

18. The method of claim 11, wherein the signal indicative of whether the load is disconnected includes pulses corresponding to the energy transferred from the primary winding to the secondary winding that indicate whether the load is disconnected.

* * * * *